United States Patent [19]

Henze et al.

[11] 4,251,940
[45] Feb. 24, 1981

[54] TROLLING APPARATUS

[75] Inventors: Walter J. Henze, Philadelphia; San Thein, Hatfield, both of Pa.

[73] Assignee: Penn Fishing Tackle Mfg. Co., Philadelphia, Pa.

[21] Appl. No.: 968,687

[22] Filed: Dec. 12, 1978

Related U.S. Application Data

[63] Continuation-in-part of Ser. No. 801,853, May 31, 1977, abandoned.

[51] Int. Cl.$^3$ ............................................. A01K 97/00
[52] U.S. Cl. .................................... 43/27.4; 242/219
[58] Field of Search ..................... 43/27.4, 4; 242/85, 242/84.5 R, 84.51 R, 84.51 A, 217, 219, 157

[56] References Cited

U.S. PATENT DOCUMENTS

| | | | |
|---|---|---|---|
| 2,783,862 | 5/1957 | Perinoni | 242/84.5 R X |
| 2,858,998 | 11/1958 | Nadolskey | 242/84.5 R |
| 3,027,114 | 3/1962 | Grieten | 242/84.5 R X |
| 3,167,272 | 1/1965 | Frode | 242/219 |
| 3,239,162 | 3/1966 | Henze | 242/219 |
| 3,434,676 | 3/1969 | Bogue | 242/84.5 R |
| 3,796,395 | 3/1974 | Rankin | 242/84.5 R |
| 3,961,438 | 6/1976 | Henze | 43/27.4 |
| 4,044,968 | 8/1977 | Scott | 43/27.4 |

FOREIGN PATENT DOCUMENTS

2247970 6/1975 France ............................. 242/84.5 R

*Primary Examiner*—Nicholas P. Godici
*Attorney, Agent, or Firm*—Zachary T. Wobensmith, 2nd; Zachary T. Wobensmith, III

[57] ABSTRACT

Trolling apparatus with controlled reel rotation is described which includes a large diameter reel rotatably mounted on a base with a drag assembly in contact therewith, and a handle for rotation mounted directly to the perimeter of the reel, with line from the reel passing over a pulley and through a bracket for bait attachment. The controlled rotation of the reel for winding and unwinding of the line is attained by direct manual manipulation, and by engaging and disengaging a dog assembly which may be manually or automatically actuated and which provides a drag on the reels' rotation.

3 Claims, 8 Drawing Figures

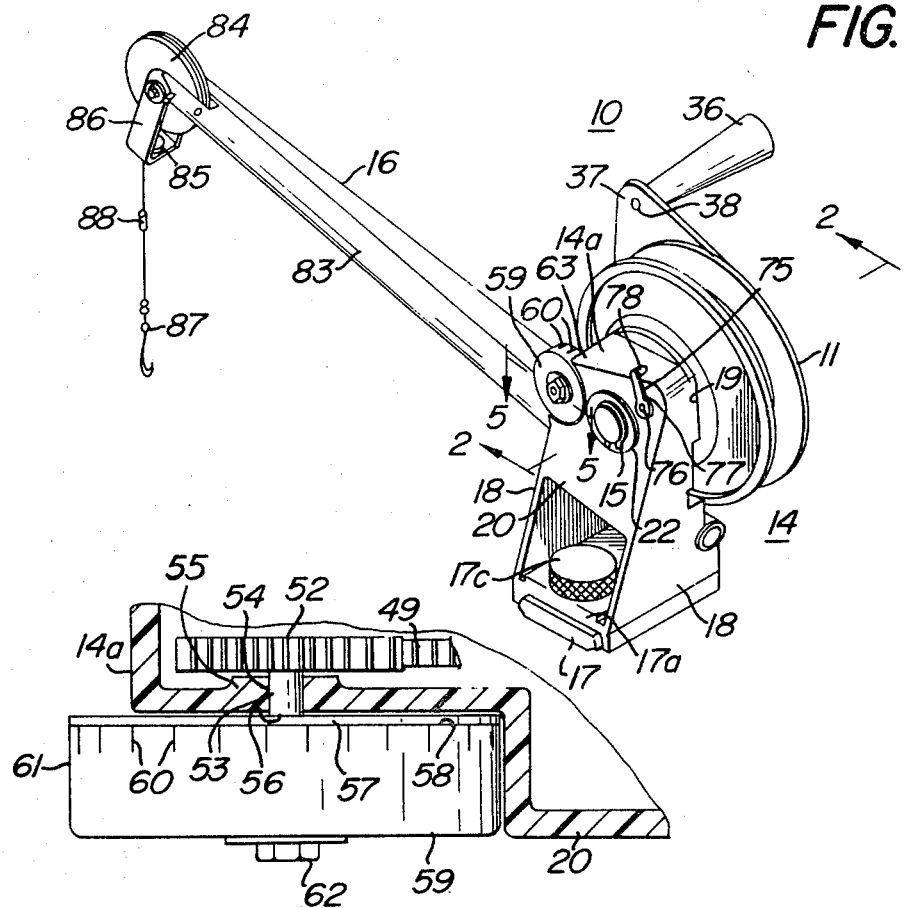
FIG. 1
FIG. 5
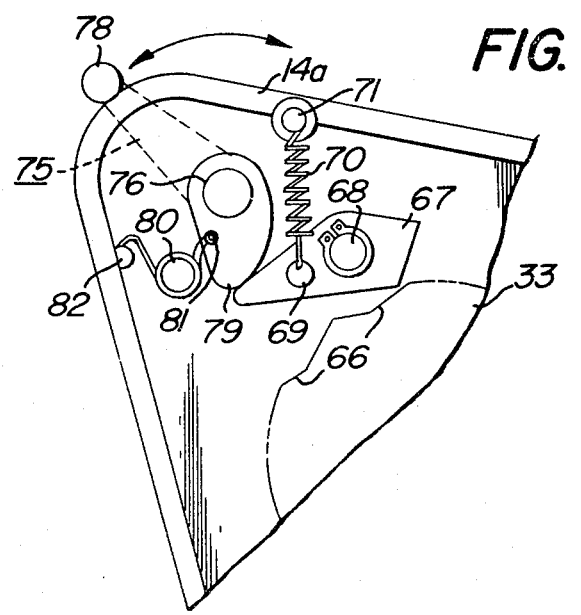
FIG. 4

TROLLING APPARATUS

CROSS REFERENCE TO RELATED APPLICATIONS

This application is a continuation in part of our prior pending application Ser. No. 801,853 filed May 31, 1977 and now abandoned.

BACKGROUND OF THE INVENTION

1. Field of the Invention

This invention relates to a trolling apparatus of the reel and boom type for measured controlled depth trolling, the reel being driven for winding by a handle directly attached thereto; a drag mechanism is provided which can manually or automatically restrict reel rotation in one direction, and which trolling apparatus may be detachably mounted to the deck or transom of a boat.

2. Description of the Prior Art

Trolling apparatus for use on a boat for placing bait at a controlled depth in a body of water has heretofore been provided.

One such apparatus is disclosed in our prior U.S. Pat. No. 3,961,438 which discloses a trolling apparatus with a large reel driven by a handle through a variable drag mechanism and which includes a counter to measure the depth at which the bait is located. While such structure operates statisfactorily, it can be awkward to operate at times. More positive control of the reel is desirable and better heat dissipation from the drag assembly is needed since the reels are preferably formed of thermoplastic resin and can be easily damaged by excessive heat. None of the trolling apparatus now available and known to us provides the desired control and/or heat dissipation.

The structure of our present trolling apparatus provides for manual or automatic drag operation, mounts the handle directly on the reel for better control and provides for improved heat dissipation.

SUMMARY OF THE INVENTION

Trolling apparatus is provided which includes a base detachably mounted to a bracket fastened to the deck or transom of a boat, which base rotatably carries a large reel. The reel is driven by a handle attached directly thereto, and a drag mechanism is provided which can be manually or automatically operated to permit the reel to run free in either direction or to restrict it in one direction of rotation. The line from the reel passes over a pulley mounted to a boom carried by the base, and through a bracket carrying a bushing that acts with a stop carried on the line to prevent line entanglement with the pulley.

A counter is provided driven by a gear train from the reel, which counter measures the line payout and can be manually reset as desired at any time.

The principal object of the invention is to provide trolling apparatus which can be used for trolling with an automatic or manually actuated drag mechanism.

A further object of the invention is to provide trolling apparatus of the character aforesaid which has a counter for measuring the line payout and consequent depth of the end of the line in the water and which can be reset to zero at any time.

A further object of the invention is to provide trolling apparatus which is detachably secured to a block which can be permanently mounted to the deck or transom of a boat.

A further object of the invention is to provide trolling apparatus for isolation and dissipation of the heat generated by the drag to protect the reel from the heat generated by the operation of the drag assembly.

A further object of the invention is to provide trolling apparatus which has a handle directly mounted to the reel for positive line control.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof, in which:

FIG. 1 is a perspective view of one embodiment of the apparatus of the invention;

FIG. 4 is a fragmentary, sectional view of one embodiment of a portion of the manually actuated drag mechanism shown in FIG. 3;

FIG. 5 is a fragmentary vertical sectional view, taken approximately on the line 5—5 of FIG. 1;

Figure 2:
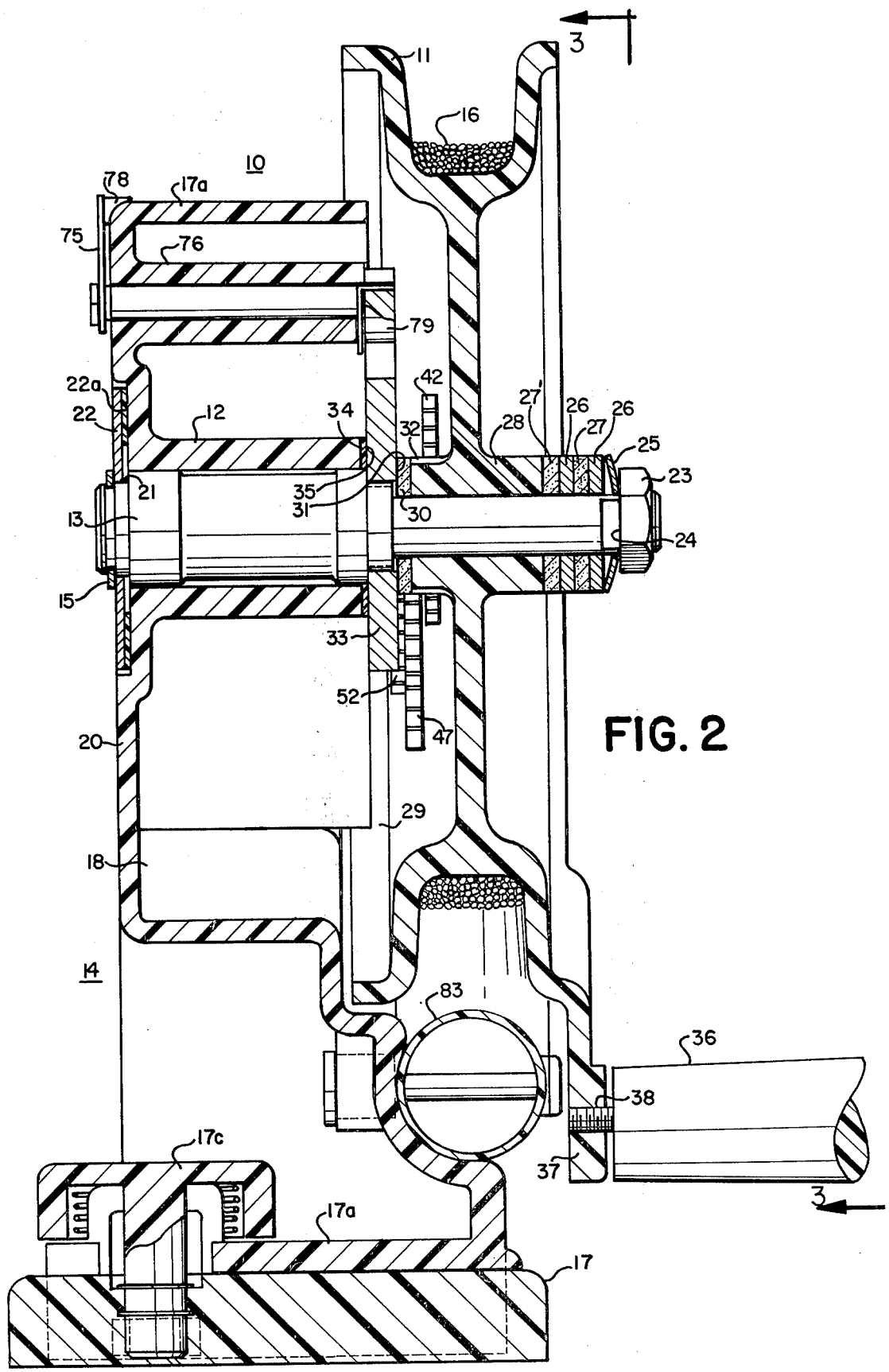
FIG. 2 is a vertical sectional view, enlarged, taken approximately on the line 2—2 of FIG. 1 and showing one form of drag mechanism.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENTS

Referring now more particularly to the drawings and FIGS. 1 to 5 thereof, the trolling apparatus 10 includes a spool or reel 11 rotatably mounted on a shaft 13. The shaft 13 is secured to and carried in a boss 12 of a base assembly 14, the shaft 13 being retained therein by a C-clip 15 engaged with the shaft 13 and carried in a recess in the boss 12.

The reel 11 is preferably formed of molded synthetic plastic.

The perimeter of the reel 11 is U-shaped in cross section for winding of line 16 onto and from the reel, and the sides of the U-shaped perimeter of reel 11 slope inwardly and downwardly.

The base assembly 14 includes a top plate 14a, bottom plate 17a, side plates 18 and front and rear connecting plates 19 and 20. The plates 14a, 17a, 18, 19 and 20 are all integral and the base assembly is preferably molded in one piece of synthetic plastic for mounting on the bottom plate 17. The bottom plate 17 is secured to the deck or transom of a boat (not shown).

The bottom plate 17 has opposite beveled side edges 17b for engagement with complemental surfaces 14b in the base 14. A releasable locking pin 17c engages the botom plate 17 to retain the base 14 in place.

The shaft 13 has a reduced diameter portion 21 which has a washer 22 and a teflon disc 22a thereon between the clip 15 and boss 12. The shaft 13 at the end opposite to portion 21 is of reduced diameter and has a self locking nut 23 in threaded engagement with an end portion 24 of shaft 13 and in engagement with a Belleville washer 25 keyed to portion 24 and engaging a metal washer 26 which engages a friction brake disc 27 engaging a second metal washer 26 and an insulating disc 27' carried on the outer end face of a boss 28 of reel 11. An insulating disc 30 is provided carried on the face of gear 32 which is an extension of and integral with boss 28 opposite to disc 27' and engaging face 31 of a disc 33 carried on and keyed to the shaft 13. A teflon washer 34 is provided between the end 35 of boss 12 and the disc 33 for non-interference rotation. The nut 23 and washer 25 control the pressure on washers 26, discs 27, 27' and 30 and therefore the drag pressure that can be exerted on the reel 11 to affect its rotation.

The reel 11 has a handle 36 thereon carried in an extension 37 thereof with a shaft 38 secured to the handle 36 engaged in the extension 37 for handle rotation.

The gear 32 has teeth 40 thereon engaged with teeth 41 of a larger diameter gear 42 carried on a shaft 43 supported in a boss (not shown) on connection plate 20 of base assembly 14. The gear 42 has a smaller diameter gear 44 secured to it which has teeth 45 engaged with teeth 46 of a larger diameter gear 47. The gear 47 is carried on a shaft 48 rotatably mounted in a boss (not shown) on plate 20 of base assembly 14 and has a smaller diameter gear 49 integral therewith with its teeth 50 engaged with the teeth 51 of a larger diameter gear 52.

The gear 52 is carried on a shaft 53 which is rotatably mounted in bore 54 of a boss 55 on plate 20.

The gears 42, 44, 47, 49, and 52 act as a reduction gear train between reel 11 and gear 52.

The shaft 53 has a shoulder 56 at the end opposite to gear 52 with a friction disc 57 of well known type carried thereon and engaging a face portion 58 of a counter wheel 59 which is provided with indicia 60 on its outer rim 61. The wheel 59 is retained on shaft 53 by nut 62 but can be rotated independently of shaft 53 against the friction of the disc 57. The intersection of plates 20 and 14a provide a reference point 63 for the indicia 60.

The disc 33 is a star-wheel which has projections 66 on its perimeter which can be engaged by a pawl or dog 67. The pawl 67 and projections 66, when engaged, permit one way free rotation of the star-wheel 33. The pawl 67 is mounted on a shaft 68 which is carried in plate 20 and has a hole 69 therein engaged by a spring 70 secured to a pin 71 fastened to the plate 20 of base assembly 14. The spring 70 urges the pawl 67 into engagement with the projections 66.

A lever 75 is provided mounted by a shaft 76 to plate 20 with an arm 77, and projection 78 for engagement by the fingers of the user (not shown). The shaft 76 has a fixedly mounted cam 79 thereon with a spring 80 engaged with a hole 81 in cam 79 and with a pin 82 in plate 20 urging the cam 79 to the engaged positon shown in FIG. 3, where pawl 67 is engaged with a projection 66 restricting the rotation of star-wheel 33. The cam 79 can be manually moved by lever 75 to the disengaged position shown in FIG. 4 where it will remain until manually moved to the engaged position of FIG. 3.

Figure 7:
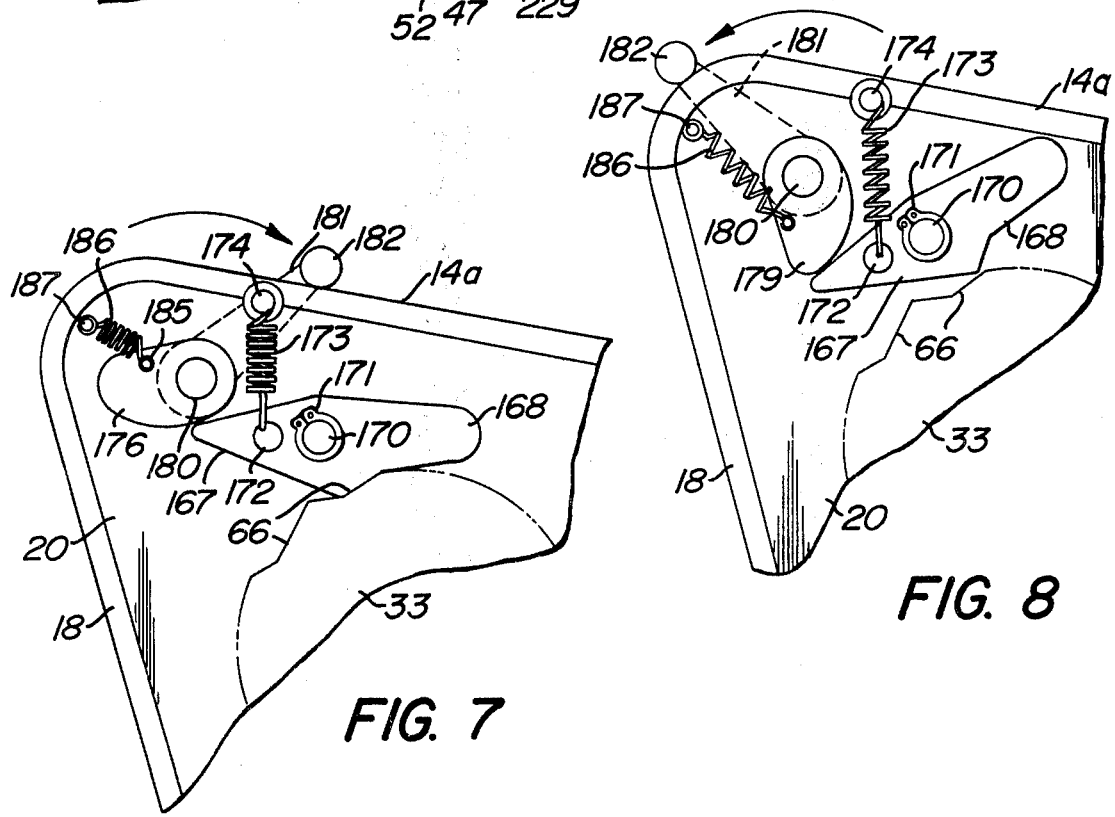
FIG. 7 is a view similar to FIG. 4 illustrating a portion of the automatically actuated drag mechanism in one position.
Figure 8:
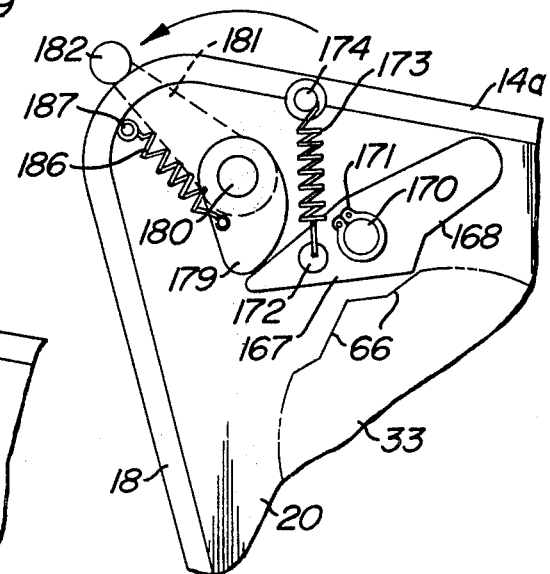
FIG. 8 is a view similar to FIG. 7 illustrating a portion of the automatically actuated drag mechanism in another position.

Referring now more particularly to FIGS. 7 and 8, another embodiment of pawl or dog 167 is therein illustrated which includes a star-wheel 33 with its projections 66 engaged by the pawl 167. The pawl 167 is larger than pawl 67 and includes a weighted extension 168 which moves the center of gravity over to the right as seen in FIGS. 7 and 8 so that the weight of the dog 167 tends to urge it into engagement with the projections 66 of star-wheel 33.

The pawl 167 is rotatably mounted on a shaft 170 with retention by a C-clip 171 thereon, the shaft 170 being carried in plate 20.

The pawl 167 has an aperture 172 therein with a spring 173 engaged therewith and with a pin 174 mounted in plate 20, the spring 173 normally urging pawl 167 into engagement with the projections 66 on star-wheel 33.

A cam 179 engages the pawl 167 and is mounted on a shaft 180 carried by plate 20 with a lever 181 and projection 182 fixedly mounted on the shaft 180. The cam 179 has a hole 185 therein with a spring 186 engaged therewith and with a pin 187 carried by plate 20 and which spring 186 normally urges the dog 167 into engagement with the projections 66 and permits one way free rotation of reel 11 but restricts other way rotation. As seen in FIG. 8, the lever 181 has been moved counterclockwise urging the pawl 167 out of engagement with projections 66, but upon release of the lever 181, the pawl 167 will re-engage the projections 66, as shown in FIG. 7.

Figure 6:
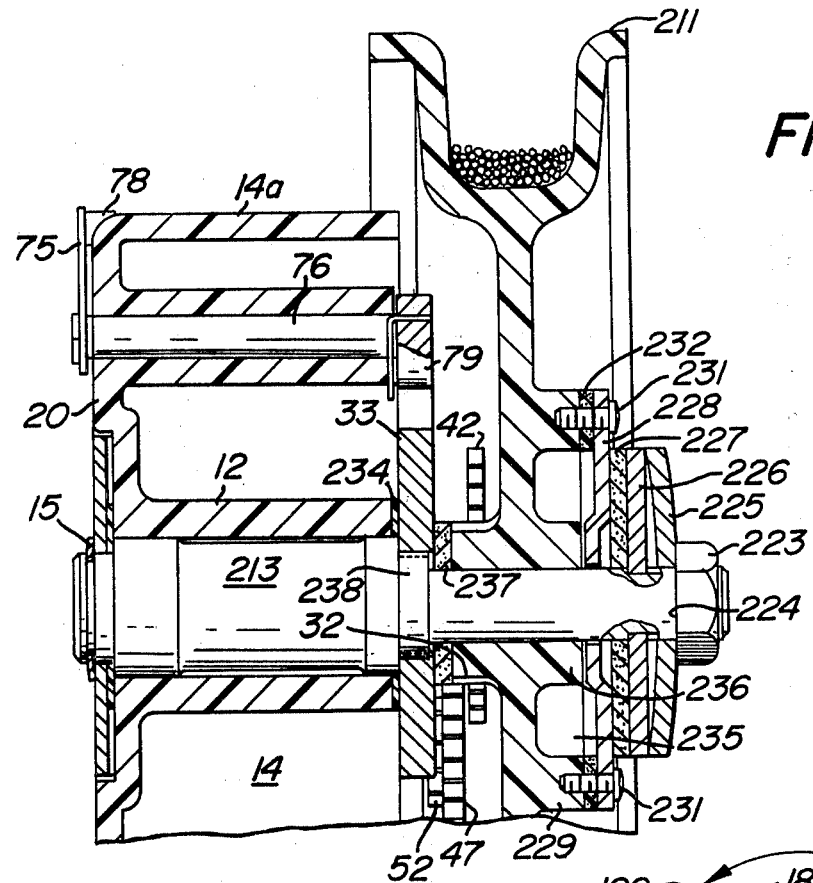
FIG. 6 is a fragmentary view similar to FIG. 2 and illustrating another form of drag mechanism.

Referring now more particularly to FIG. 6, another embodiment of drag assembly is illustrated which includes a spool or reel 211 similar to reel 11 in general configuration but with differences to be described below.

The reel 211 is rotatably mounted on a shaft 213 secured to and carried in the boss 12 of a base assembly 14. The shaft 213 is retained in the boss 12 by a C-clip 15. The base assembly 14 carries a gear train as described for reel 11 which includes gears 32, 42, 44, 47, 49, and 52.

The shaft 213 at the end opposite to clip 15 has self locking nut 223 thereon in threaded engagement with an end portion 224 of shaft 213 and a Belleville washer 225 engaging a metal disc 226 which is keyed to shaft 213, and which engages a friction brake disc 227 which can rotate independently of shaft 213. The metal disc 226 is preferably formed of aluminum to provide for heat dissipation generated by disc 227.

The brake disc 227 bears against a dished plate 228 which is secured to a hub 229 of reel 211 by four screws 231 passing through a heat insulating washer 232 therebetween.

The plate 228 is spaced from the shaft 213 and partially closes off a heat dissipating cavity 235 formed by the hub 229 and the hub 236 which rotatably mounts the reel 211 on shaft 213.

The reel hub 236 at the end opposite to plate 228 engages a heat insulating washer 237 which engages a star-wheel 33 which is fixedly mounted to a portion 238 of shaft 213 with a teflon washer 234 between star-wheel 33 and boss 12.

The base assembly 14 has a boom 83 extending therefrom which rotatably carries a pulley 84 over which line 16 from reel 11 or 211 passes and out through a bushing 85 in a bracket 86 rotatably mounted to the boom 83. The line 16 can include a stop 88 thereon to prevent the line end with attachments 87 from passing through bushing 85 and tangling on pulley 84.

The mode of operation will now be pointed out.

Assuming that a supply of line 16 is wound onto the reel 11 or 211 and suitable attachments 87 are provided on the end of the line 16 and that trolling is desired, a weight (not shown) is attached to the attachments 87 and a fishing line (not shown) with hook (not shown) and quick release mechanism (not shown) is connected to attachments 87. The user grasps the handle 36 to prevent free rotation of the reel 11 or 211. The depth to which it is desired to troll is determined and the lever 75 or 181 is rotated counterclockwise as seen in FIG. 4 or 8 to release the pawl 67 or 167 from contact with projections 66 so that reel 11 or 211 can rotate and line 116 pay out. The user keeps on holding the handle 36 and lets it turn at a desired speed until the desired depth is reached.

The counter wheel 50 is set with the zero mark of indicia 60 at reference point 63 prior to releasing the lever 75 or 181. The rotation of reel 11 through gears 42, 44, 47, 49, and 52 rotates the wheel 59 which with indicia 60 and reference point 63 indicates the amount of line paid out.

Figure 3:
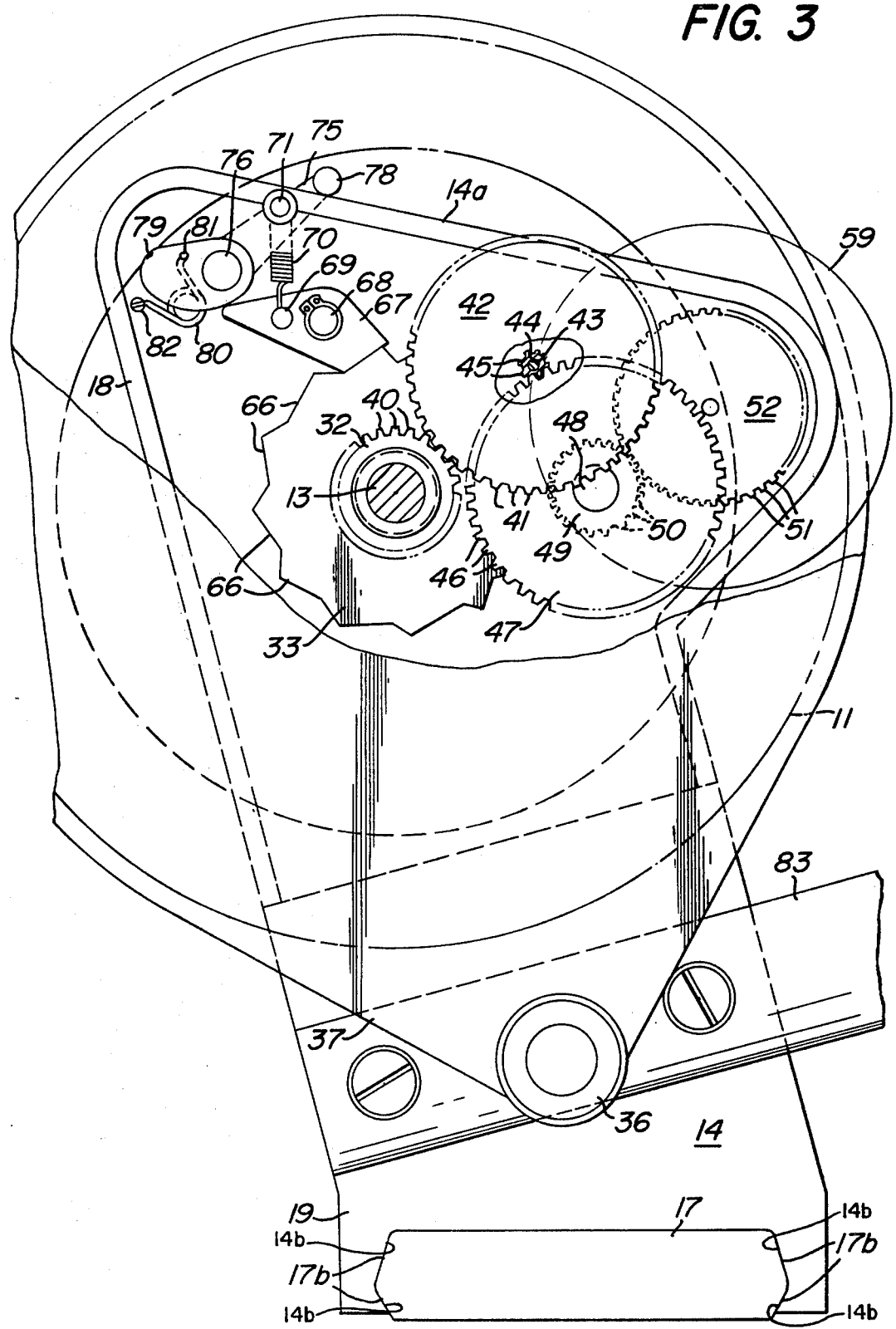
FIG. 3 is a side elevational view in partial section of the apparatus of the invention.

When the desired depth is reached, the lever 181 is released by the user and it automatically rotates clockwise under spring pressure to cause pawl 167 to engage a projection 66, stop star-wheel 33, and therefore, engage drag on reel 211. If manual actuation is desired, the embodiment in FIGS. 3 and 4 is used with the lever 75 rotated clockwise to engage position (FIG. 3) where it remains until manually rotated to free position (FIG. 4).

When drag is provided, the shaft 13 or 213 can rotate in one direction only. The reel 11 or 211 engaged by drag can be turned freely only to raise the line 16. Any pull on line 16 to pay it out would be prevented to the extent of the drag, which is preset by adjustment of the nut 23 or 223. If tangling of line 16 on the bottom occurs or if by some other incident, the line 16 is jerked out, the drag would yield and line 16 would be paid out without any damage. If the speed of incidental line pay-out is high, heat would be generated at the plate 228 and disc 237 and washers 26 and disc 27, however, the reels 11 and 211 are protectively insulated from that heat.

When a fish strikes or when it is desired to raise the line 16, then the handle 36 may be rotated manually and through the mechanism described above the reel 11 or 211 will rotate clockwise and line 16 wound thereon.

The apparatus may be used for fishing without another line and hook by substitution of a hook and bait for the attachments 87 and the operation can proceed as described above.

It will thus be seen that apparatus has been provided with which the objects of the invention are attained.

We claim:

1. Trolling apparatus for fishing which comprises
  a base,
  a boom secured to said base and having a pulley thereon for carrying of line,
  a shaft carried by said base and free to rotate with respect to said base,
  a reel with a supply of line thereon with said line extending over said pulley,
  said reel being rotatably mounted on said shaft and normally free to rotate on said shaft,
  a handle mounted on said reel for manual rotation of said reel,
  drag means for said reel comprising
    a plurality of washers and an interposed friction disc on said shaft frictionally engaged with said reel and said shaft for imparting a drag therebetween,
  said reel on one side thereof having a plurality of concentric hubs,
  a dished plate mounted to said reel spanning said hubs and an insulating washer therebetween projecting said reel from the heat generated by said drag means,
  means for controlling the intensity of the drag effect of said friction disc,
  a star-wheel member mounted on said shaft for rotation therewith,
  a pawl member mounted to a plate adjacent said star-wheel member and movable into and out of position for holding engagement with said star-wheel member for limiting free rotation of said reel to one direction, and
  means for controlling the positioning of said pawl member.

2. Trolling apparatus as defined in claim 1 in which said means for controlling the drag effect of said friction disc includes a self locking nut, and a belleville washer carried on said shaft engaged by said nut and said washers.

3. Trolling apparatus as defined in claim 1 in which said means controlling the positioning of said pawl member includes resilient means engaged with said pawl member and means mounted on said plate for urging said pawl into and out of engagement with said star-wheel member.

* * * * *